UNITED STATES PATENT OFFICE.

HENRY EBERDING, OF PATERSON, NEW JERSEY, ASSIGNOR TO THE WELDING COMPOUND COMPANY.

WELDING COMPOUND.

SPECIFICATION forming part of Letters Patent No. 601,436, dated March 29, 1898.

Application filed May 26, 1897. Serial No. 638,235. (No specimens.)

*To all whom it may concern:*

Be it known that I, HENRY EBERDING, a citizen of the United States, residing in Paterson, county of Passaic, and State of New Jersey, have invented certain new and useful Improvements in Welding Compounds; and I do hereby declare the following to be a full, clear, and exact description of the invention, such as will enable others skilled in the art to which it appertains to make and use the same.

The object of my present invention is to thoroughly grind, pound, or crush waste of steel—such as scraps, turnings, chips, &c.—to a fineness suitable for the manufacture of welding compounds—such as, for instance, that described in United States Letters Patent No. 584,581, of June 15, 1897.

Heretofore iron has been ground by suitable machinery and has been combined with various ingredients to form welding compounds.

By experiments it has been proven that steel is far superior, when used in combination with different ingredients, for such welding compounds, and especially when in a state of powder corresponding to a fineness of ten to thirty meshes per inch.

Steel filings to a certain extent furnish, when properly combined with other ingredients, welding compounds giving some satisfaction; but the production of said filings is slow and expensive, and, moreover, a certain percentage of the carbon is used up during the process of filing. Furthermore, filings can only be produced from larger pieces of steel, while for grinding, crushing, &c., waste of steel can be used, and this is very important, as the waste, up to the present time, is of no commercial value, as it cannot be melted into ingots or other forms suitable for the trade.

To carry my invention into effect, I take scraps or turnings or chips or any waste of steel and place the same into a grinding-mill of any well-known construction; but I want it understood that pounders, rolling-mills, crushers, &c., can be used without deviating from my invention. The scraps, chips, &c., are then ground to the fineness required, as above stated, and are afterward, if so desired, sifted through suitable sieves, nettings, or bolting-cloths.

I am aware that iron has been ground by suitable mills to be used for welding compounds, and I do not make any claim thereon; but

What I claim as new, and desire to secure by Letters Patent, is—

A welding compound, one of the ingredients of which is ground, powdered or crushed steel in the state of powder corresponding to a fineness of ten to thirty meshes per inch.

In testimony that I claim the foregoing I have hereunto set my hand this 25th day of May, 1897.

HENRY EBERDING.

Witnesses:
ALFRED GARTNER,
WM. D. BELL.